United States Patent Office 3,031,466
Patented Apr. 24, 1962

3,031,466
MANUFACTURE OF SUBSTITUTED
POLYCYCLIC QUINONES
Richard Budziarek and Samuel Coffey, Manchester, England, assignors to Imperial Chemical Industries Limited, London, England, a corporation of Great Britain
No Drawing. Filed Sept. 19, 1958, Ser. No. 761,946
Claims priority, application Great Britain Sept. 25, 1957
9 Claims. (Cl. 260—373)

This invention relates to a process for the manufacture of substituted polycyclic quinones and more particularly it relates to a process for the manufacture of alpha-hydroxy-beta-nitro-anthraquinones.

In British specification No. 670,720 there is described and claimed a process for the manufacture of polycyclic quinones carrying a nitro and a hydroxy group as nuclear substituents which comprises treating polycyclic quinones carrying at least two nuclear substituents selected from the class consisting of nitro and halogeno, with a metal nitrite in an organic solvent, or when the starting material contains at least one nitro group optionally in a mixture of an organic solvent and water. This process suffers from the disadvantage that when an unsymmetrically substituted polycyclic quinone is used as starting material the product obtained comprises a mixture of different isomers and such a mixture is difficult to separate into the pure components. In addition suitable alpha:beta-disubstituted polycyclic quinones, which may be used as starting materials to obtain alpha-hydroxy-beta-nitropolycyclic quinones, are difficult to obtain so that the production of pure alpha-hydroxy-beta-nitropolycyclic quinones by this process is not easily achieved.

It has now been found that when an anthraquinone containing a halogen atom or a hydroxy or a nitro group in an alpha-position, but which is not substituted in the beta-position, is treated in a solvent with a metal nitrite and an acid, an alpha-hydroxy-beta-nitro-anthraquinone is obtained in good yield.

According to the invention there is provided a process for the manufacture of alpha-hydroxy-beta-nitro-anthraquinones which comprises treating an anthraquinone containing a halogen atom or a hydroxy or a nitro group in an alpha-position, but which is not substituted in the beta-position, with a metal nitrite and an acid in a solvent.

The process of the invention may be conveniently brought about by heating the anthraquinone used as starting material with the metal nitrite in a suitable water-miscible solvent, adding a solution of the acid in the same water-miscible solvent, heating the resulting mixture for a period to complete the reaction, pouring the mixture into water, acidifying with hydrochloric acid and filtering off the alpha-hydroxy-beta-nitro-anthraquinone which is precipitated.

As examples of suitable metal nitrites which may be used in the process of the invention there may be mentioned sodium nitrite, sodium cobaltinitrite and potassium nitrite. As examples of suitable acids which may be used in the process of the invention there may be mentioned inorganic acids for example hydrochloric acid, sulphuric acid and boric acid and organic acids for example benzoic acid, oxalic acid, acetic acid, succinic acid and tartaric acid.

Specific examples of suitable anthraquinones which may be used in the process of the invention are 1-hydroxyanthraquinone, 1-chloranthraquinone and 1-nitroanthraquinone (which by the process of the invention yield 2-nitro-1-hydroxyanthraquinone), 1:5-dihydroxyanthraquinone, 1:5-dinitroanthraquinone and 1:5-dichloroanthranone (which yield 2-nitro-1:5-dihydroxyanthraquinone), 1-hydroxy-5-benzoylaminoanthraquinone and 1-chloro-5-benzoylaminoanthraquinone (which yield 2-nitro-1-hydroxy-5-benzoylaminoanthraquinone), 1-hydroxy-5-p-toluenesulphonamidoanthraquinone (which yields 2-nitro-1-hydroxy-5-p-toluenesulphonamidoanthraquinone) and 1:8-dihydroxyanthraquinone, 1:8-dinitroanthraquinone and 1:8-dichloroanthraquinone (which yield 2-nitro-1:8-dihydroxyanthraquinone).

In view of the wide range of starting materials which can be used, it will be apparent that the optimum conditions required for reaction with different starting materials will vary considerably. With some starting materials a slow reaction is detectable at temperatures as low as 80° C. and the reaction proceeds rapidly at about 120° C., whereas with other starting materials a temperature of about 150° C. or higher is required to obtain a useful reaction rate.

When the anthraquinone used in the process of the invention contains at least two halogen atoms or hydroxy or nitro groups in alpha positions, for example 1-chloro-5-nitroanthraquinone, each of the halogen atoms or nitro groups are converted to hydroxy groups and a nitro group is introduced into a beta position to one of these hydroxy groups.

The product so obtained, for example 2-nitro-1:5-dihydroxyanthraquinone which is obtained from 1-chloro-5-nitroanthraquinone, can then be further treated with a metal nitrite and an acid in a solvent whereby a nitro group is introduced into the beta position to the second hydroxy group, for example 2:6-dinitro-1:5-dihydroxyanthraquinone being obtained from 2-nitro-1:5-dihydroxyanthraquinone.

Also with some starting materials hydroxylic solvents, for example beta-ethoxyethanol can be used, whereas with less reactive starting materials such solvents are not suitable. Among the solvents which we have found to be generally useful, there should be mentioned dimethylsulphoxide and the organic amides derived from secondary amines of the type used in British specification No. 610,117, for example dimethylformamide and N-isopropylphthalimidine. If required mixtures of solvents can be used.

The process of the invention is especially valuable for the production in good yield, of hitherto unknown alpha-hydroxy-beta-nitro-anthraquinones. As examples of such new alpha-hydroxy-beta-nitro-anthraquinones there may be mentioned 2-nitro-1:5-dihydroxyanthraquinone and 2-nitro-1-hydroxy-5-benzoylaminoanthraquinone.

The invention is illustrated but not limited by the following examples in which the parts and percentages are by weight.

*Example 1*

A mixture of 2 parts of 1-hydroxyanthraquinone, 4 parts of sodium nitrite and 80 parts of dimethylformamide is stirred at 150° C. for 6 hours after which time nitrous fumes are no longer evolved. A solution of 3.3 parts of benzoic acid in 80 parts of dimethylformamide is then added gradually over 18 hours, the temperature of the mixture being kept at 150° C. The mixture is heated for a further 6 hours at 150° C., and is then poured into 400 parts of a 5% aqueous solution of hydrochloric acid. The yellow precipitate so obtained is filtered off washed with water and dried. The 1-hydroxy-2-nitro-anthraquinone thus obtained crystallises from beta-ethoxyethanol in the form of greenish-yellow leaflets which melt at 194° C.

A similar result is obtained when the 3.3 parts of benzoic acid used in the above example are replaced by 1.4 parts of sulphuric acid.

*Example 2*

In place of the 2 parts of 1-hydroxyanthraquinone used in Example 1 there are used 2 parts of 1:5-dihydroxyanthraquinone. The 2-nitro-1:5-dihydroxyanthraquinone so obtained crystallises from chlorobenzene in the form of yellowish-orange plates which melt at 225° C.

*Example 3*

A mixture of 20 parts of 1-chloroanthraquinone, 49 parts of sodium nitrite and 1000 parts of dimethylformamide is stirred at the boil under a reflux condenser for 24 hours. A solution of 42 parts of benzoic acid in 300 parts of dimethylformamide is then added gradually over 20 hours, whilst the mixture is stirred at the boil. The mixture is then poured into 3000 parts of a 5% aqueous solution of hydrochloric acid and the solid which is precipitated is filtered off washed with water and dried. The 2-nitro-1-hydroxyanthraquinone so obtained crystallises from beta-ethoxy-ethanol in the form of greenish-yellow leaflets which melt at 194° C.

*Example 4*

A mixture of 160 parts of 1-chloro-5-benzoylaminoanthraquinone, 200 parts of sodium nitrite and 3000 parts of dimethylformamide is stirred at the boil under a reflux condenser and a solution of 170 parts of benzoic acid in 750 parts of dimethylformamide is added gradually over 48 hours. The mixture so obtained is poured into 15,000 parts of a 10% aqueous solution of hydrochloric acid and the mixture stirred for 2 hours at 20° C. The solid so obtained is filtered off, washed with water and dried. The 2-nitro-5-benzoylamino-1-hydroxyanthraquinone so obtained crystallises from chlorobenzene in the form of orange prisms, which melt at 246°–248° C.

*Example 5*

A mixture of 10 parts of 1-chloro-5-p-toluenesulphonamidoanthraquinone, 10 parts of sodium nitrite and 200 parts of dimethylformamide is stirred at the boil under a reflux condenser and a solution of 9.5 parts of benzoic acid in 75 parts of dimethylformamide is then added gradually over 48 hours. The mixture so obtained is poured into 800 parts of a 5% aqueous solution of hydrochloric acid and the solid which is precipitated is filtered off, washed with water and dried to give 2-nitro-5-p-toluenesulphonamido-1-hydroxyanthraquinone, which melts at 222°.

*Example 6*

In place of the 10 parts of 1-chloro-5-p-toluenesulphonamidoanthraquinone used in Example 5 there are used 10 parts of 1:5-dinitroanthraquinone. The 2-nitro-1:5-dihydroxyanthraquinone so obtained crystallises from chlorobenzene in the form of yellow orange plates which melt at 225° C.

In place of the 10 parts of 1:5-dinitroanthraquinone used in the above example there may be used 10 parts of 1:5-dichloroanthraquinone or 10 parts of 1-chloro-5-nitroanthraquinone or 10 parts of 1-chloro-5-hydroxyanthraquinone when 2-nitro-1:5-dihydroxyanthraquinone is similarly obtained.

*Example 7*

In place of the 10 parts of 1-chloro-5-p-toluenesulphonamidoanthraquinone used in Example 5 there are used 10 parts of 1:8-dinitroanthraquinone when 2-nitro-1:8-dihydroxyanthraquinone is obtained in the form of orange plates which melt at 220° C.

In place of the 10 parts of 1:8-dinitroanthraquinone used in the above example there may be used 10 parts of 1:8-dichloroanthraquinone or 10 parts of 1:8-dihydroxyanthraquinone or 10 parts of 1-chloro-8-nitroanthraquinone or 10 parts of 1-chloro-8-hydroxyanthraquinone or 10 parts of 1-nitro-8-hydroxyanthraquinone when 2-nitro-1:8-dihydroxyanthraquinone is similarly obtained.

*Example 8*

A mixture of 2 parts of 2-nitro-1:5-dihydroxyanthraquinone, 2 parts of sodium nitrite and 50 parts of dimethylformamide is stirred at the boil under a reflux condenser and a solution of 1 part of benzoic acid in 7 parts of dimethylformamide is then added gradually over 62 hours. The mixture so obtained is poured into 200 parts of a 5% aqueous solution of hydrochloric acid and the precipitated solid is filtered off, washed with water and dried. The solid crystallises from chlorobenzene to give 2:6-dinitro-1:5-dihydroxyanthraquinone in the form of bronze-coloured plates which melt at 275°.

What we claim is:

1. Process for the manufacture of an α-hydroxy-β-nitroanthraquinone having the hydroxy and nitro groups in adjacent position which comprises heating a β-unsubstituted anthraquinone selected from the group consisting of α-chloro-α-hydroxy, and α-nitroanthraquinones with a metal nitrite in a water-miscible solvent for said reactants, and adding thereto an acid selected from the group consisting of inorganic acids and organic carboxylic acids, in a water-miscible organic solvent for the said reactants and heating, said heating being at a temperature above 80° C., to form said α-hydroxy-β-nitroanthroquinone.

2. Process according to claim 1 wherein said metal nitrite is sodium nitrite.

3. Process according to claim 1 wherein said acid is benzoic acid.

4. Process according to claim 1 wherein said solvent is dimethylformamide.

5. The process of claim 1, wherein said β-unsubstituted anthraquinone is 1-chloro-5-benzoylaminoanthraquinone.

6. The process of claim 1, wherein said β-unsubstituted anthraquinone is 1-chloro-5-p-toluenesulphonamidoanthraquinone.

7. The process of claim 1, wherein said β-unsubstituted anthraquinone is 1:5-dichloroanthraquinone.

8. The process of claim 1, wherein said β-unsubstituted anthraquinone is 1:8-dichloroanthraquinone.

9. The process of claim 1, wherein said β-unsubstituted anthraquinone is 2-nitro-1:5-dihydroxyanthraquinone.

References Cited in the file of this patent
UNITED STATES PATENTS
2,587,093    Belshaw et al. _____ Feb. 26, 1952

FOREIGN PATENTS
90,041    Germany _____ Nov. 28, 1896